(12) United States Patent
Seifert et al.

(10) Patent No.: US 12,345,646 B2
(45) Date of Patent: Jul. 1, 2025

(54) COMBINED SPECTROSCOPY SYSTEM INCLUDING RAMAN AND ATR-FTIR

(71) Applicant: ASOCIACION CENTRO DE INVESTIGACION COOPERATIVE EN NANOCIENCIAS "CIC NANOGUNE", San Sebastian (ES)

(72) Inventors: Andreas Seifert, San Sebastian (ES); Gajendra Pratap Singh, San Sebastian (ES)

(73) Assignee: ASOCIACIÓN CENTRO DE INVESTIGACIÓN COOPERATIVA EN NANOCIENCIAS "CIC NANOGUNE", San Sebastian (ES)

( * ) Notice: Subject to any disclaimer, the term of this patent is extended or adjusted under 35 U.S.C. 154(b) by 214 days.

(21) Appl. No.: 17/998,508

(22) PCT Filed: May 11, 2021

(86) PCT No.: PCT/EP2021/062511
§ 371 (c)(1),
(2) Date: Nov. 11, 2022

(87) PCT Pub. No.: WO2021/228873
PCT Pub. Date: Nov. 18, 2021

(65) Prior Publication Data
US 2023/0194428 A1 Jun. 22, 2023

(30) Foreign Application Priority Data
May 12, 2020 (EP) .................................. 20382389

(51) Int. Cl.
*G01N 21/65* (2006.01)
*G01J 3/10* (2006.01)
(Continued)

(52) U.S. Cl.
CPC .............. *G01N 21/65* (2013.01); *G01J 3/108* (2013.01); *G01J 3/42* (2013.01); *G01J 3/44* (2013.01);
(Continued)

(58) Field of Classification Search
CPC .. G01J 3/0294; G01J 3/10; G01J 3/108; G01J 3/42; G01J 3/427; G01J 3/44;
(Continued)

(56) References Cited

U.S. PATENT DOCUMENTS 5,841,139 A * 11/1998 Sostek ...................... G01J 3/44
250/339.05
6,690,966 B1 * 2/2004 Rava .................... A61B 5/0086
600/478

(Continued)

FOREIGN PATENT DOCUMENTS

CN 106546533 A * 3/2017 .......... A61B 5/0075
JP 58153905 9/1983
(Continued)

OTHER PUBLICATIONS

"Adsorption of CTAB on Hydrophilic Silica Studied by Linear and Nonlinear Optical Spectroscopy", in the name of Eric Tyrode et al., published on Journal of the American Chemical Society, Dec. 24, 2008.

*Primary Examiner* — Gordon J Stock, Jr.
(74) *Attorney, Agent, or Firm* — S.J. Intellectual Property LTD.

(57) ABSTRACT

System for simultaneous measurement Raman and mid-infrared absorption signals from a sample, the system comprising an ATR crystal adapted for holding a sample thereon, at least one Raman excitation light source for Raman excitation, at least one FTIR excitation light source for FTIR excitation, at least one photodetector configured for collect-
(Continued)

ing signals with a wavelength comprised at least in one of the IR spectrum or the Raman spectrum, a wavelength-dispersive device, such as a spectrometer, for collecting Raman signals, an excitation lens, and collection optics comprising a first collection lens.

22 Claims, 3 Drawing Sheets

(51) Int. Cl.
  *G01J 3/42* (2006.01)
  *G01J 3/44* (2006.01)
  *G01N 21/35* (2014.01)
  *G01N 21/552* (2014.01)
(52) U.S. Cl.
  CPC ........... *G01N 21/35* (2013.01); *G01N 21/552* (2013.01); *G01N 2021/3595* (2013.01)
(58) Field of Classification Search
  CPC .... G01J 3/4412; G01J 3/443; G01J 2003/003; G01J 2003/102; G01J 2003/104; G01J 2003/106; G01N 21/31; G01N 21/3151; G01N 21/35; G01N 21/3504; G01N 21/3563; G01N 21/3577; G01N 21/3581; G01N 21/359; G01N 21/47; G01N 21/55; G01N 21/552; G01N 21/63; G01N 21/65; G01N 2021/1734; G01N 2021/1736; G01N 2021/1738; G01N 2021/3595
  See application file for complete search history.

(56) References Cited

U.S. PATENT DOCUMENTS

| | | | |
|---|---|---|---|
| 8,547,555 B1 * | 10/2013 | Bradley | G01J 3/021 356/445 |
| 8,730,468 B2 * | 5/2014 | Messerchmidt | G01N 21/552 356/300 |
| 8,797,028 B2 * | 8/2014 | Verschuren | G01N 15/06 422/68.1 |
| 8,970,838 B2 * | 3/2015 | Messerschmidt | G01N 21/65 356/73 |
| 9,869,585 B2 * | 1/2018 | Schiering | G01J 3/108 |
| 10,209,195 B2 * | 2/2019 | Jian | G01N 21/65 |
| 10,794,764 B2 * | 10/2020 | Zhang | G01J 3/0208 |
| 11,137,290 B2 * | 10/2021 | Ota | G01N 21/65 |
| 2010/0273269 A1 * | 10/2010 | Van Lankvelt | G01N 33/54333 436/164 |
| 2015/0192462 A1 | 7/2015 | Schiering et al. | |
| 2016/0143539 A1 | 5/2016 | Stuttgart | |

FOREIGN PATENT DOCUMENTS

| | | | | |
|---|---|---|---|---|
| WO | WO-2016086071 A1 * | 6/2016 | | G01N 21/00 |
| WO | 2019092772 A1 | 5/2019 | | |

* cited by examiner

COMBINED SPECTROSCOPY SYSTEM INCLUDING RAMAN AND ATR-FTIR

TECHNICAL FIELD OF THE INVENTION

The present invention belongs to the field of chemical characterization and, more particularly, to the field of vibrational spectroscopic technologies for molecular fingerprint identification.

BACKGROUND OF THE INVENTION

In the field of detection and identification of chemical signatures of samples, vibrational spectroscopy-based techniques such as Raman spectroscopy and Fourier transform infrared absorption spectroscopy (FTIR) are the most promising due to their high chemical specificity.

These techniques are used distinctly depending on the nature of the sample, which is being analyzed. As it is well-known in industry, these technologies have several differences, which have led to the development of very different detectors and specific optical equipment.

The main difference between the two techniques is that Raman spectroscopy is based on inelastic scattering of light caused by vibrational states of molecules, whereas FTIR spectroscopy is the result of absorption of mid-infrared light by vibrating molecules.

The complementary behavior of both techniques is due to the electronic characteristics of the vibrations that take place to determine the structure of the molecule. In Raman spectroscopy the molecules experience a change in polarizability during vibration, whereas in FTIR the molecule experiences a change in the dipole moment during vibration.

With respect to the wavelength in which each technique operates, the Raman technique works with a monochromatic beam or laser, mainly in the visible, near-infrared, or ultraviolet range of the electromagnetic spectrum. However, FTIR spectroscopy uses a broadband light beam in the mid-infrared region of the electromagnetic spectrum.

Despite the differences stated above, both techniques provide clear identification of molecules, and, due to said differences, some molecules that cannot or can only be weakly detected with one spectroscopy method can be detected better with the other one, and vice versa, what makes them complementary. Therefore, a combined solution would prove a valuable and helpful tool for the characterization of a wide range of components.

A few solutions have been supplied by industry in order to provide a product combining these two technologies. These solutions have proven unsatisfactory, as they are designed for samples with high Raman cross section. However, most biosamples have low Raman cross section and thus require instruments with high optical throughput to collect Raman signals, which cannot be collected by current devices due to the background generated by optical fibers comprised within.

Another important point to consider is that aqueous solutions of bioanalytes, such as proteins or cells, are not homogenous solutions in general and over time the bioanalytes tend to settle down in the sample holder. For example, denatured proteins have a tendency to precipitate while normal proteins remain in solution.

Again, the current technology does not allow for detecting protein structure variations in solution.

SUMMARY OF THE INVENTION

The present invention provides a solution for the aforementioned problems, by a system for measuring Raman and infrared absorption signals from a sample according to claim 1. In the dependent claims, preferred embodiments of the invention are defined.

In a first inventive aspect, the invention provides a system for simultaneous measurement of Raman and infrared absorption signals from a sample, the system comprising:
- an attenuated total reflection (ATR) crystal adapted for holding a sample thereon,
- at least one Raman excitation light source for Raman excitation,
- at least one FTIR excitation light source for FTIR excitation,
- at least one photodetector configured for collecting signals with a wavelength comprised at least in one of the IR spectrum or the Raman spectrum,
- a wavelength-dispersive device, such as a spectrometer, for the collected Raman signals,
- an excitation lens, and
- collection optics comprising a first collection lens.

The ATR crystal is configured to receive a light beam from the FTIR excitation light source, to redirect the light beam to the sample, to receive modified reflected radiation due to interaction of the evanescent field with the sample and to redirect it so that it can be received by at least one photodetector.

In an embodiment the ATR crystal is made of a mid-infrared transparent material, preferably diamond, ZnSe or Germanium.

The excitation lens and the ATR crystal are positioned so that a first optical path is defined, such that the excitation lens is configured to focus into the sample a light beam emitted from the Raman excitation light source.

The ATR crystal and the collection optics are positioned so that a second optical path is defined, such that the collection optics is configured to collect Raman scattered light emitted by the sample and to redirect said Raman scattered light to at least one photodetector through the wavelength-dispersive device.

The system for measuring Raman and infrared absorption signals from a sample has the advantage of providing a reliable chemical identification of multiple constituents based on both the Raman and FTIR spectrum.

Advantageously, both spectroscopy methods can be used at the same time, or in toggling mode, without removing or readjusting the sample. The elements responsible for carrying out each spectroscopy method can be adjusted individually and do not interfere with each other. In this sense, when referring to each spectroscopy subsystem, i.e., the FTIR subsystem and/or the Raman subsystem, it shall be understood as the corresponding elements responsible for carrying out each respective method.

In relation with the individual actuation of each spectroscopy subsystem, the optomechanical design of the system is set up regarding the two decoupled spectroscopy methods carried out by each subsystem. On one hand, the FTIR light beam is guided by total internal reflection through the ATR crystal and, thus, will not enter or interfere with the Raman collection path.

Therefore, the disposition of the elements belonging to the FTIR spectroscopy subsystem, along with the high refractive index of the ATR crystal, help to attain the total internal reflection at the sample interface, where an evanescent wave which extends into the sample is generated due to attenuated total reflection. Then, the modified reflected radiation is redirected without interfering with the collection optics belonging to the Raman spectroscopy subsystem.

On the other hand, the Raman subsystem is an off-axis system that allows for optical sectioning under certain circumstances.

In an embodiment, the ATR crystal comprises two plane-parallel surfaces and two side facets, wherein one of the plane-parallel surfaces is intended for supporting the sample, wherein the light beam emitted from the Raman excitation light source enters the ATR crystal through the other plane-parallel surface and wherein the FTIR light beam enters the ATR crystal through one of the side facets. Here, the light beam emitted from the Raman excitation light source goes through the plane-parallel surfaces of the ATR crystal and cannot be guided by total internal reflection (TIR) inside the crystal, and hence, will not enter the detection path of the FTIR subsystem.

Therefore, the Raman scattered light is collected by the collection optics without interfering with the detection path of the FTIR subsystem.

Accordingly, the ATR crystal guides the light beam from the FTIR excitation light source and focuses said beam into the sample by total internal reflection, while having enough transmission for guiding both the light beam from the Raman excitation light source and the Raman scattered light emitted by the sample upon interaction with the light beam from the Raman excitation light source.

In an operational example, the wavelength of Raman excitation light is less than or equal to 1600 nm.

Advantageously, the present invention allows to acquire optically sectioned Raman signals combined with infrared signal, from the same sample without disturbing its surroundings. Thus, chemical signatures from different layers of the sample can be obtained, which is important for the analysis of biological samples, which are often heterogeneous.

In the present system, the light beams in both the Raman subsystem and the FTIR subsystem are transmitted through free space, i.e. without the use of optical fibers.

Regarding the drawbacks associated with the use of optical fibers in traditional spectroscopy systems, among the most relevant are coupling losses, fluorescence, and the background generated. Advantageously, the free space geometry of the present invention increases the optical throughput and allows transporting higher amounts of light. Additionally, coupling losses are prevented, and fluorescence is greatly reduced. In a more particular embodiment, the system comprises quartz optics for avoiding fluorescence.

Therefore, and advantageously, the system is provided with improved detection of molecules with low Raman cross-section due to the low background generated and the high optical throughput.

For FTIR excitation, the FTIR light source can include one or several sources emitting in the desired wavelength range, as for example lasers, LEDs or lamps. Further, in a particular embodiment, the system comprises an interferometric setup for the mid-infrared light of the FTIR light source being wavelength-selective.

In an embodiment, the FTIR excitation light source is a mid-infrared light source, such as one made of SiC or a quantum cascade tunable laser.

In an embodiment the Raman excitation light source is a laser.

In an embodiment, the system comprises a sample holder onto which the sample is placed. In a more particular embodiment, wherein the sample is in liquid state, the sample holder is a plate with a cavity shaped thereon. For example, the sample holder can be a glass or metal plate with a hole. When a sample holder is provided with the system, said sample holder is configured for allowing the ATR crystal to be in contact with the sample, thus allowing the passage of both light beams from the FTIR excitation light source and the Raman excitation light source. When the sample is in solid state, the sample may be placed on the ATR crystal, in contact with it, without the use of a sample holder.

In an embodiment the samples are provided on top of the ATR crystal, whereas the Raman sampling radiation is coupled on its lower side, the Raman subsystem probing from the bottom of the sample. This is advantageous, especially in the case of liquids, as liquid samples are thus probed without refocusing due to evaporation, as it occurs with current Raman microscopes probing from top of the sample.

In an embodiment, the excitation lens is configured to be movable along a direction parallel to the first optical path, thus allowing to focus through the ATR crystal into the sample at adjustable depths a light beam emitted from the Raman excitation light source, what allows off-axis excitation geometry, thus providing the system with optical sectioning capability.

In an embodiment, the collection lens is configured to be movable along a direction parallel to the second optical path. Thus, signals corresponding to different excited planes of the sample can be collected, the system thus being able of providing optically sectioned Raman signal corresponding to the different layers excited. Advantageously, said optically sectioned signal can be provided in real time while the system is also providing an infrared signal simultaneously.

In an embodiment, the excitation lens is configured to be movable along a direction parallel to the first optical path and the collection lens is configured to be movable along a direction parallel to the second optical path.

In an embodiment the system comprises a controller configured to control the position of the first collection lens and/or of the excitation lens.

All combinations between numerical aperture (NA) values of the excitation lens and the collection lens of the Raman subsystem may be regarded as embodiments of the present invention. In this sense, said lenses are preferably replaceable to allow various illumination and collection modalities.

In particular, high values of NA for the excitation lens lead to excitation of small volumes, while lower values of NA lead to excitation of larger volumes. In turn, high values of NA for the collection lens lead to integration of information from small volumes, while lower values of NA lead to integration of information from extended volumes.

In an embodiment, the collection lens is configured to be movable along a direction parallel to the second optical path. Preferably, in this embodiment, the collection lens has a high numerical aperture value, more preferably greater than 0.4.

Advantageously, the movement of the collection lens according to a direction parallel to the second optical path, provides the Raman subsystem with sectioning and depth discrimination capabilities. In particular, according to this particular embodiment, the collection lens will be able to be moved closer or farther from the ATR crystal.

In optics, 'high' or 'low' NA values are well-known terms, being mostly dependent on the final application. For exemplification purposes, in the context of the invention, as a general rule, "high NA values" may be considered for values above 0.4 while "low NA values" may be considered for values below 0.2.

In an embodiment, the collection lens has a low numerical aperture value, preferably lower than 0.2.

In an embodiment, the excitation lens has a low numerical aperture value, preferably lower than 0.2.

Advantageously, embodiments with low values of NA for the exciting lens illuminate the focus area with blurred illumination, thus helping to protect the sample from radiation damage, and providing more homogeneous spatial illumination/excitation.

In an embodiment, the excitation lens is configured to be movable:
- longitudinally along a direction parallel to the first optical path, and/or
- in a direction transverse to the first optical path.

Advantageously, providing the excitation lens with two degrees of freedom in order to allow it to move:
- according to a direction parallel to the direction of the light beam emitted by the Raman excitation light source, and/or
- according to a direction transverse to the direction of the light beam emitted by the Raman excitation light source, provides the Raman subsystem with imaging, sectioning and depth discrimination capabilities.

Preferably, in this embodiment the excitation lens has a high numerical aperture value, preferably greater than 0.4. Advantageously, due to the high NA of the excitation lens, the signal-to-noise ratio increases in cases when optical sectioning technique is carried out.

Further advantageously, lateral movement of the excitation lens as defined, allows achieving confocal condition with the collection lens.

In an embodiment, the whole collection optics belonging to the Raman subsystem can be moved laterally, i.e. in a direction transversal to the second optical path.

Advantageously, the sectioning and imaging capabilities of the Raman subsystem are improved, since lateral movement of the collection optics allows for collecting scattered light in the desired places. In other words, the flexibility to move laterally provides the Raman subsystem with local discrimination capabilities, which allows for laterally scanning a little spot with deeper insight.

Any of the Raman subsystem and the FTIR subsystem may comprise additional optical elements, such as at least one lens, at least one prism and/or at least one mirror.

In an embodiment the system comprises a first prism configured to receive a light beam from the FTIR excitation light source and to redirect said light beam to the ATR crystal, and/or a second prism configured to receive the modified reflected radiation from the ATR crystal, and to redirect said modified reflected radiation.

Advantageously, the presence of a first and/or a second prism provided at the side facets of the ATR crystal provides the system with a more versatile configuration that allows easier coupling of the FTIR light beam and helps in reducing light losses due to over-illumination of the ATR entrance facet, as well as better handling and mechanical stability, due to the more robust configuration of the ATR crystal-prism assembly.

In an embodiment the first prism and/or the second prism is made of a dielectric material suitable for transporting and coupling light into the ATR crystal, wherein said material is preferably one of ZnSe, Silicon or $CaF_2$. In a preferred embodiment, the first prism and/or the second prism has the same refractive index as the ATR crystal.

In an embodiment, the system comprises a first mirror configured to receive a light beam from the FTIR excitation light source, and to redirect said light beam, and/or a second mirror configured to redirect the modified reflected radiation to the at least one photodetector.

Advantageously, the first and/or second mirrors provide the system with better adjustment and beam-shaping capabilities. In other words, the mirrors allow for guiding and realigning the light beams in order to couple the FTIR light beam into the ATR crystal, or to guide the FTIR light beam outcoming from the ATR crystal to the photodetector.

In a more particular embodiment, the first mirror and/or the second mirror is a paraboloidal mirror.

In an embodiment, the system comprises a fixed mirror, a beam splitter and a movable mirror, wherein the beam splitter is configured to split the beam emitted by the FTIR excitation light source into two split beams, wherein the fixed mirror is arranged to receive one split beam and to reflect it back to the beam splitter, wherein the movable mirror is arranged to receive the other split beam and to reflect it back to the beam splitter and wherein the first mirror is arranged to receive the beam resulting from the interference of the two split beams and to redirect it towards the ATR crystal or towards intermediate optical elements, such as a mirror and/or a prism, which direct the beam to the ATR crystal.

In an embodiment the system comprises only one photodetector, wherein the photodetector is configured for collecting signals with a wavelength comprised both in the IR spectrum and in the Raman spectrum. In this embodiment the ATR crystal is configured to redirect the modified reflected radiation due to interaction of the evanescent field with the sample so that it can be received by said photodetector. Also, the collection optics is configured to redirect Raman scattered light to said photodetector. In an embodiment the photodetector is made of mercury cadmium telluride (HgCdT).

In another embodiment, the at least one photodetector comprises a first photodetector configured for collecting signals with a wavelength comprised in the IR spectrum and a second photodetector configured for collecting signals with a wavelength comprised in the Raman spectrum. In this embodiment the modified reflected radiation is redirected so that it can be received by the first photodetector, and the collection optics is configured to redirect Raman scattered light to the second photodetector. In this embodiment the first and the second photodetector are individual devices arranged at separate positions.

For collecting the IR signals, the first photodetector can be made of InAsSb, thermopile or mercury cadmium telluride (HgCdT), or any appropriate semiconductor material for the corresponding wavelength range or a combination of those.

In a particular embodiment, for collecting the Raman signals, the second photodetector is made of Silicon or InGaAS.

Advantageously, according to this embodiment any possible leakage of FTIR mid infrared radiation is not detected by the second photodetector, which is not sensitive to mid infrared light.

In an embodiment, the system comprises at least one optical element arranged to redirect the modified reflected radiation to the first photodetector, such as at least one prism and/or at least one mirror.

In an embodiment the system comprises a processing unit in data communication with the photodetector and the wavelength-dispersive device, the processing unit comprising a spectral data library for identifying the signals measured by the at least one photodetector. Advantageously, an integrated Raman and FTIR spectral library is provided for identification by the processing unit.

A method of determining the chemical constituents of a sample by using the system of the invention is also provided and it makes use of an integrated software platform. By mathematically combining Raman and FTIR spectra by machine learning algorithms, as multivariate analysis methods, deep learning algorithms or artificial neural networks, both types of spectra may be used by the same algorithms at the same time for finding significant features. The algorithms make use of the chemical information present in both Raman and FTIR spectra. They can include, but are not limited to, principal component analysis (PCA), linear discriminant analysis (LDA), partial least squares (PLS), classical least squares (CLS), support vector machines (SVM) and other supervised and/or non-supervised algorithms. They can also use a hybrid method combining supervised and non-supervised techniques.

In an embodiment the system comprises a band pass filter for filtering the light beam from the Raman excitation light source, wherein the band pass filter is located in the first optical path between the Raman excitation light source and the excitation lens.

In a more particular embodiment, wherein the Raman excitation light source is a laser, the bandpass filter is centered around the laser central wavelength to clean the light from unwanted background or sidelobes. In an operational example, the bandpass filter has <3 nm bandwidth and blocks amplified spontaneous emission (ASE) or plasma lines from the laser. The material of the filter can be fused silica to minimize background signal.

In an embodiment the collection optics further comprise a long pass filter and a second collection lens, wherein the first collection lens, the long pass filter and the second collection lens are located in the second optical path such that:

the first collection lens is configured to collect Raman scattered light from the sample, the long pass filter is configured for filtering the Raman scattered light collected by the first collection lens, and the second collection lens is configured for collecting the filtered Raman scattered light from the long pass filter and to redirect said filtered Raman scattered light to the photodetector configured for collecting signals with a wavelength comprised in the Raman spectrum together with the wavelength-dispersive device.

In this embodiment, if there is only one photodetector, the second collection lens is configured to redirect the filtered Raman scattered light to said photodetector. If there are two photodetectors, the second collection lens is configured to redirect the filtered Raman scattered light to the photodetector configured for collecting signals with a wavelength comprised in the Raman spectrum.

Either way, the wavelength-dispersive device (e.g. the spectrometer) comes first before the photodetector for collecting signals with a wavelength comprised in the Raman spectrum. The photodetector is the final optoelectronic element in the wavelength-dispersive device and may be comprised therein.

In a more particular embodiment, the first collection lens, the long pass filter, the second collection lens comprised in the collection optics, the wavelength dispersive device and the second photodetector are assembled so as to be movable in a direction transverse to the second optical path.

As described before, the whole collection optics belonging to the Raman subsystem can be moved laterally, i.e. in a direction transversal to the second optical path, in order to improve the sectioning and imaging capabilities of the Raman subsystem.

Advantageously, in this embodiment the elements that are part of the collection optics are assembled so as be moved together laterally, along with the final elements in the second optical path, i.e. the wavelength-dispersive device and the second photodetector. This configuration allows for collecting scattered light in the desired places. In other words, the said flexibility to move laterally provides the Raman subsystem with local discrimination capabilities, which allows for laterally scanning a little spot with deeper insight.

In an embodiment the system is configured to be wearable.

In a second inventive aspect, the invention provides a method for adding a new record to a spectral data library provided in an embodiment of the system, wherein this method comprises the steps of:

i. providing a system according to any of the embodiments of the first inventive aspect;

ii. placing the new sample on the ATR crystal to be hold thereon;

iii. activate both the Raman excitation light source for Raman excitation and the FTIR excitation light source for FTIR excitation;

iv. collecting both signals by the at least one photodetector;

V. associating such measured signal to such sample thus forming the new record; and vi. adding such new record to the spectral data library stored in the processing unit of the system.

The spectral data library itself can be thereby constructed with this method by repeating the steps for different samples.

In a particular embodiment, the chemical constituents of the sample are determined by using an integrated software platform that mathematically combines Raman and FTIR spectra by using machine learning algorithms, such as multivariate analysis methods, deep learning algorithms or artificial neural networks.

In an embodiment, the integrated software platform comprises principal component analysis (PCA), and/or linear discriminant analysis (LDA), and/or partial least squares (PLS), and/or classical least squares (CLS), and/or support vector machines (SVM) algorithms, and/or any other multiparametric machine learning algorithm.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
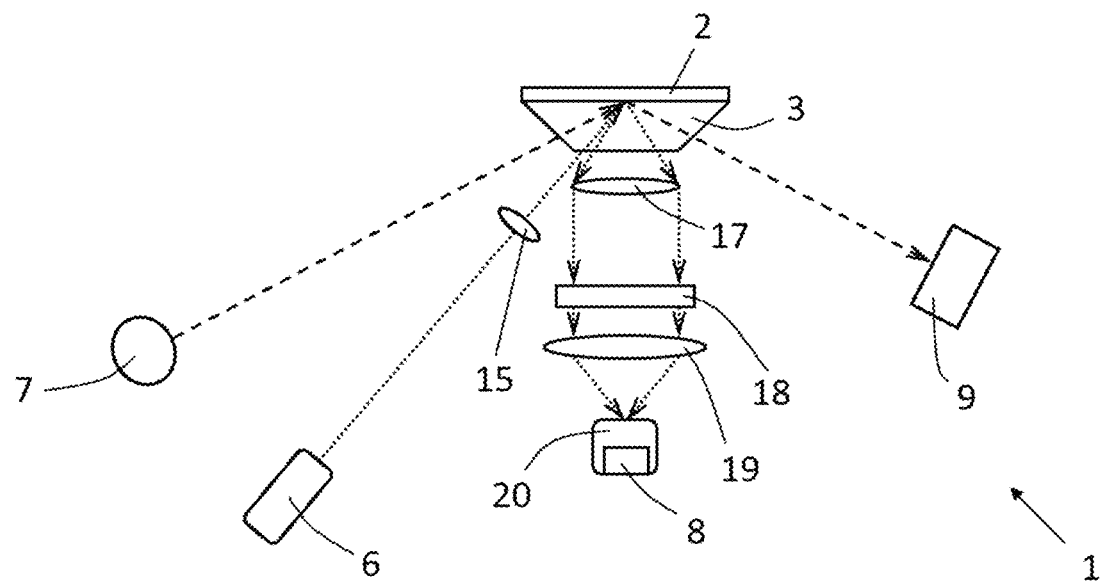
FIG. 1 shows a system for measuring Raman and infrared absorption signals from a sample according to an embodiment of the invention.
Figure 2:
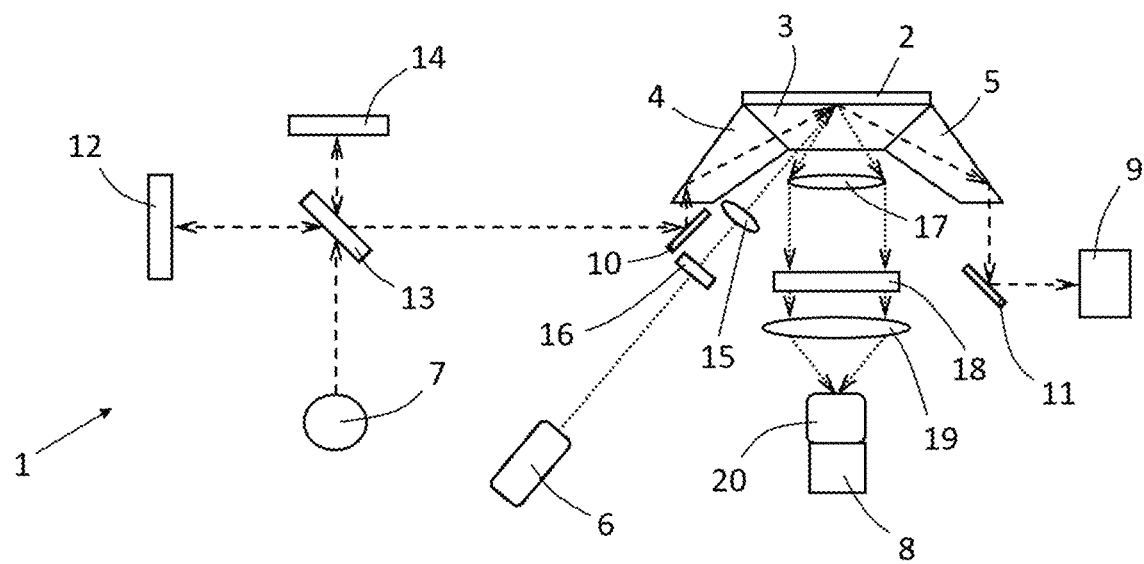
FIG. 2 shows a system for measuring Raman and infrared absorption signals from a sample according to an embodiment of the invention.

FIGS. 1 and 2 depict a system (1) for simultaneous measurement of Raman and infrared absorption signals from a sample (2) according to two embodiments of the invention. The systems (1) shown in both figures are in an operative mode obtaining a Raman and an infrared absorption signal from a single sample (2) simultaneously. In these figures the light beams are represented with arrows, wherein the Raman subsystem light beams are represented with dotted lines and the FTIR subsystem light beams are represented with dashed lines.

In particular, the systems (1) shown in both FIGS. 1 and 2 comprise an ATR crystal (3), onto which the sample (2) is provided. Said ATR crystal (3) is configured to receive a light beam from the FTIR excitation light source (7), to redirect the light beam to the sample (2), and to receive modified reflected radiation due to interaction of the evanescent field with the sample (2). The high refractive index of the ATR crystal (3) helps to attain the total internal reflection at the sample (2) interface, where an evanescent wave, which extends into the sample (2), is generated due to attenuated total reflection. Then, the infrared beam is directed, so that it can be received by a first photodetector (9) configured for collecting signals with a wavelength comprised in the IR spectrum.

Additionally, for performing the excitation function of both the FTIR and the Raman subsystems, the systems (1) in both FIGS. 1 and 2 comprise one Raman excitation light source (6) for Raman excitation, and one FTIR excitation light source (7) for FTIR excitation, respectively.

For obtaining the infrared absorption signal, an infrared light source (7), which in this embodiment is a broadband source, as for example a SiC light source, operating from visible to mid infrared wavelengths (400 nm-25000 nm), emits an infrared beam.

Preferably, this broadband source, e.g. the SiC light source, operates at mid-infrared wavelengths (2.5 μm-25 μm).

Further, in the excitation side of the Raman spectroscopy subsystem, the system (1) comprises an excitation lens (15). Said excitation lens (15) along with the ATR crystal (3) is positioned so that a first optical path is defined. The excitation lens (15) is configured to focus into the sample (2) a light beam emitted from the Raman excitation light source (6).

In turn, in the collection side of the Raman subsystem, the system (1) comprises collection optics comprising a first collection lens (17). The ATR crystal (3) and the collection optics are positioned so that a second optical path is defined, such that the collection optics is configured to collect Raman scattered light emitted by the sample (2) and to redirect said Raman scattered light to a wavelength-dispersive device (20), such as a Raman spectrometer. A second photodetector (8) registers the Raman signal. In the system (1) of FIG. 1 the second photodetector (8) is embodied integrated with the wavelength-dispersive device (20), namely comprised in the second photodetector (8). In the system (1) of FIG. 2 the second photodetector (8) and the wavelength-dispersive device (20) are embodied as separate devices connected one to another.

Additionally, for obtaining optically sectioned Raman signals from the sample (2), the collection optics of the systems (1) shown in both FIGS. 1 and 2 comprise a long pass filter (18) configured for filtering the Raman scattered light collected by the first collection lens (17) and a second collection lens (19) configured for collecting the filtered Raman scattered light from the long pass filter (18) and to redirect said filtered Raman scattered light to the wavelength-dispersive device (20) and the photodetector (8) configured for collecting signals with a wavelength comprised in the Raman spectrum.

Compared to the system (1) shown in FIG. 1, the system (1) shown in FIG. 2 additionally comprises a first (4) and a second (5) prism which are shown coupled at the side facets of the ATR crystal (3) for coupling the FTIR light beam. The first (4) and a second (5) prisms and the ATR crystal (3) are shaped and assembled resulting in a geometry which allows integration of the collection optics of the Raman subsystem.

Further, the system (1) shown in FIG. 2 comprises additional elements belonging to the FTIR subsystem. In particular, the system (1) comprises a beam splitter (13) configured to split the beam emitted by the FTIR excitation light source (7) into two split beams; a fixed mirror (12) arranged to receive one split beam and to reflect it back to the beam splitter (13); and a movable mirror (14) arranged to receive the other split beam and to reflect it back to the beam splitter (13). The system (1) shown in FIG. 2 further comprises a first mirror (10) arranged to receive the beam resulting from the interference of the two split beams and to redirect it to the first prism (4); and a second mirror (11) configured to redirect the modified reflected radiation to the first photodetector (9) configured for collecting signals with a wavelength comprised in the IR spectrum.

The beam splitter (13) shown in FIG. 2 splits the infrared light beam emitted by the FTIR excitation light source (7) into a first and second split beam. The first split beam is then directed towards the fixed mirror (12), whereas the second split beam is directed towards the movable mirror (14). Afterwards, reflections corresponding to both split beams interfere, and the resulting infrared beam is then directed towards the first mirror (10) which, in turn, redirects said infrared beam towards the first prism (4), which is in optical connection with the ATR crystal (3). The infrared beam goes through total internal reflection in the ATR crystal (3), which in the present embodiment can be made, for example, of diamond.

The high refractive index of the ATR crystal (3) and the first prism (4) helps to attain the total internal reflection at the sample interface, where an evanescent wave which extends into the sample is generated due to total internal reflection. Then, the infrared beam is directed, through the second prism (5) connected to the ATR crystal (3), towards a second mirror (11) which, in turn, redirects the infrared beam towards the first photodetector (9), the infrared absorption signal being collected thereby.

Compared to the system (1) shown in FIG. 1, for obtaining optically sectioned Raman signal from the sample (2), the system (1) shown in FIG. 2 comprises additional elements belonging to the Raman spectroscopy subsystem. In particular, the system (1) further comprises a band pass filter (16) configured for filtering the light beam emitted by the Raman excitation light source (6).

In particular, the Raman excitation light source (6), which in this particular embodiment is a laser, emits a light beam towards a band pass filter (16) which is used to block unwanted background or sidelobes from the laser (6). Then, after passing through the band pass filter (16), the light beam passes through the excitation lens (15) which is used to focus the light beam onto the sample (2) as well as to excite several layers in the sample (2).

The light beam is then directed to the sample (2) interface after passing through the ATR crystal (3). Then, the first collection lens (17) collects and collimates the Raman scattered light and redirects it into the second collection lens (19) after passing through the long pass filter (18), which blocks scattered laser light and leakage from the filter.

Afterwards, the second collection lens (19) redirects and focuses the resulting Raman scattered light towards the wavelength-dispersive device (20) and the second photodetector (8), registering the Raman signal thereby.

With the advent of miniaturizing technologies, the system (1) according to the invention can be easily implemented as portable Raman and FTIR spectrometers for real time in situ chemical analyses. A portable combined Raman and FTIR system (1) has the potential of providing robust information to first responders, such as law enforcement, military and healthcare workers in order to estimate, or mitigate impending chemical threats.

The unmatched advantage of such a combined system (1) is that reliable chemical identification of multiple constituents can be obtained in seconds, including complex mixtures.

Figure 3:
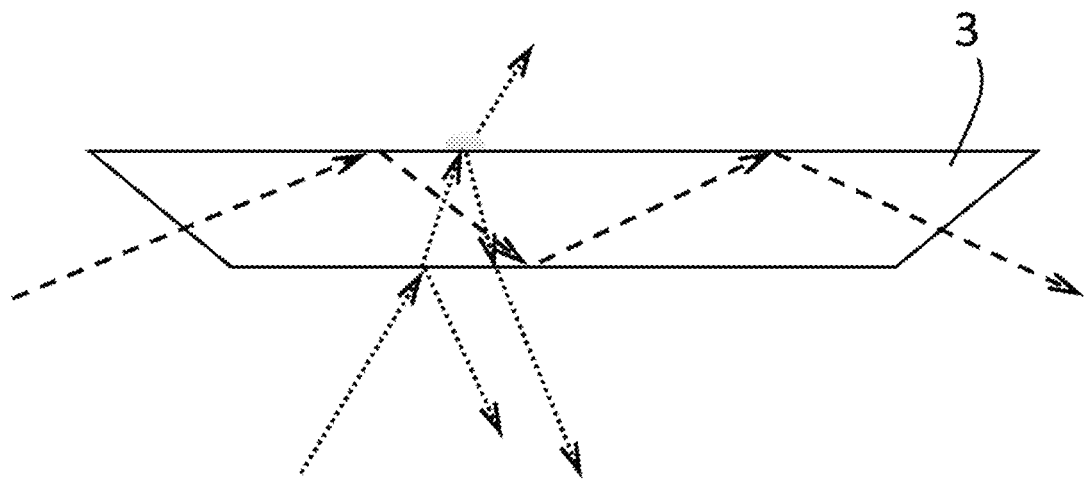
FIG. 3 shows an example of Raman excitation light and FTIR excitation paths within a schematic ATR crystal according to an embodiment of the invention.

FIG. 3 depicts a schematic ATR crystal (3) according to an embodiment of the invention where respective paths of Raman excitation light and FTIR excitation light within are shown.

The ATR crystal (3) has a (isosceles) trapezoid shape in cross-section and comprises two plane-parallel surfaces and two side facets, wherein one of the plane-parallel surfaces is intended for supporting the sample. As it is depicted, the light beam emitted from the Raman excitation light source enters the ATR crystal (3) through the other plane-parallel surface and goes through plane-parallel surfaces of the ATR crystal (3) without being guided by total internal reflection (TIR) inside the crystal (3). Therefore, Raman excitation light will not enter the detection path of the FTIR subsystem.

It is to be noted that, regardless the incident angle of the Raman excitation light, the light cannot be transported by TIR within the ATR crystal as long as the light is coupled through the long surface (i.e. lower surface in the figure), which is plane-parallel to the surface at the sample side.

On the other hand, the FTIR light beam enters the ATR crystal through one of the side facets and the high refractive index of the ATR crystal helps to attain the total internal reflection at the sample interface. Then, the modified reflected radiation is redirected without interfering with the light beam emitted from the Raman excitation light source.

Figure 4:
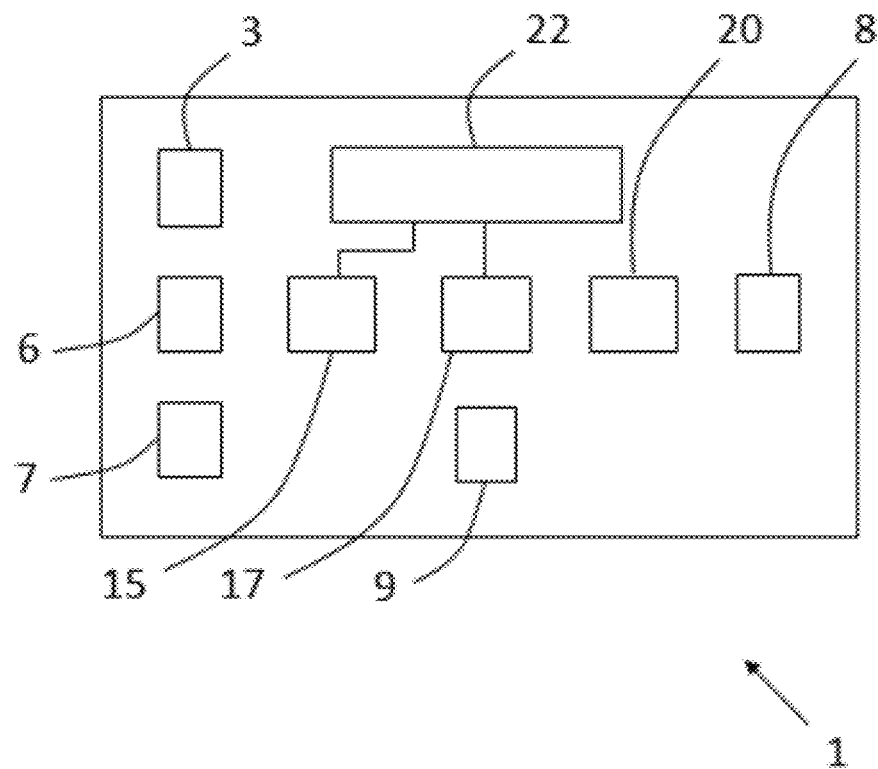
FIG. 4 shows a system for measuring Raman and infrared absorption signals from a sample according to an embodiment of the invention.

FIG. 4 shows a system (1) for simultaneous measurement of Raman and infrared absorption signals from a sample according to an embodiment of the invention. The system (1) comprises:
  an ATR crystal (3) adapted for holding a sample thereon,
  at least one Raman excitation light source (6) for Raman excitation,
  at least one FTIR excitation light source (7) for FTIR excitation,
  at least one photodetector (8, 9) configured for collecting signals with a wavelength comprised at least in one of the IR spectrum or the Raman spectrum,
  a wavelength-dispersive device (20), such as a spectrometer, for the collected Raman signals,
  an excitation lens (15), and
  collection optics comprising a first collection lens (17),
  wherein the ATR crystal (3) is configured to receive a light beam from the FTIR excitation light source (7), to redirect the light beam to the sample, to receive modified reflected radiation due to interaction of the evanescent field with the sample and to redirect it so that it can be received by at least one photodetector (8, 9),
  wherein the excitation lens (15) and the ATR crystal (3) are positioned so that a first optical path is defined, such that the excitation lens (15) is configured to focus into the sample a light beam emitted from the Raman excitation light source (6), and
  wherein the ATR crystal (3) and the collection optics are positioned so that a second optical path is defined, such that the collection optics is configured to collect Raman scattered light emitted by the sample and to redirect said Raman scattered light to at least one photodetector (8, 9) through the wavelength-dispersive device.

The system (1) of FIG. 4 further comprises a controller (22) configured to control the position of the excitation lens (15) and/or of the collection optics.

Figure 5:
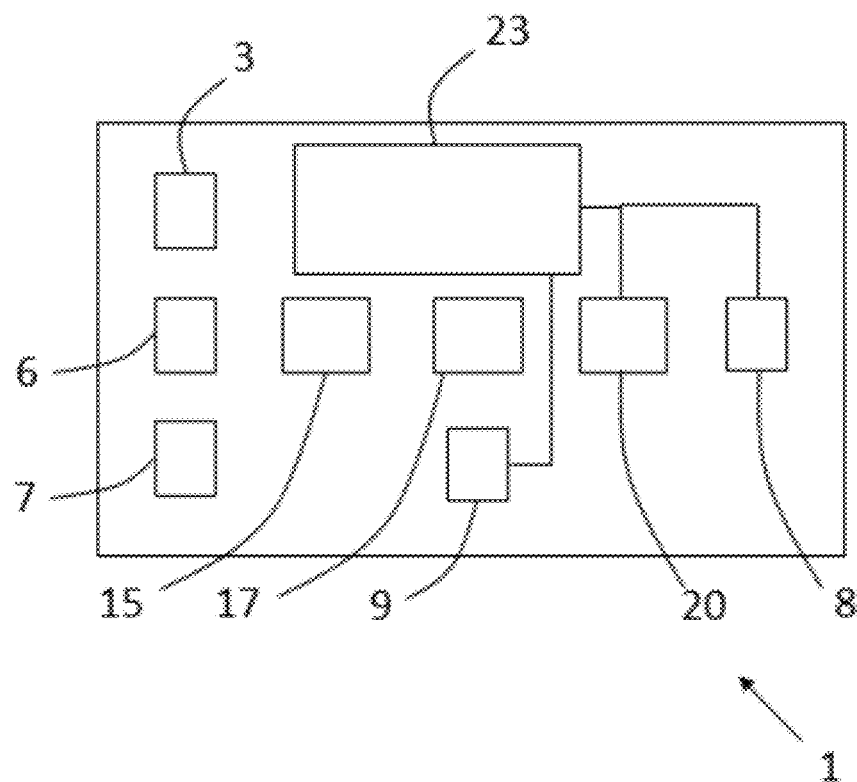
FIG. 5 shows a system for measuring Raman and infrared absorption signals from a sample according to an embodiment of the invention.

FIG. 5 shows a system (1) for simultaneous measurement of Raman and infrared absorption signals from a sample according to an embodiment of the invention. The system (1) comprises:
  an ATR crystal (3) adapted for holding a sample thereon,
  at least one Raman excitation light source (6) for Raman excitation,
  at least one FTIR excitation light source (7) for FTIR excitation,
  at least one photodetector (8, 9) configured for collecting signals with a wavelength comprised at least in one of the IR spectrum or the Raman spectrum,
  a wavelength-dispersive device (20), such as a spectrometer, for the collected Raman signals,
  an excitation lens (15), and
  collection optics comprising a first collection lens (17),
  wherein the ATR crystal (3) is configured to receive a light beam from the FTIR excitation light source (7), to redirect the light beam to the sample, to receive modified reflected radiation due to interaction of the evanescent field with the sample and to redirect it so that it can be received by at least one photodetector (8, 9),
  wherein the excitation lens (15) and the ATR crystal (3) are positioned so that a first optical path is defined, such that the excitation lens (15) is configured to focus into the sample a light beam emitted from the Raman excitation light source (6), and
  wherein the ATR crystal (3) and the collection optics are positioned so that a second optical path is defined, such that the collection optics is configured to collect Raman scattered light emitted by the sample and to redirect said Raman scattered light to at least one photodetector (8, 9) through the wavelength-dispersive device.

The system (1) of FIG. 5 further comprises a processing unit (23) in data communication with the at least one photodetector (8, 9) and the wavelength-dispersive device (20), the processing unit comprising a spectral data library for identifying the signals measured by the at least one photodetector (8, 9).

Figure 6:
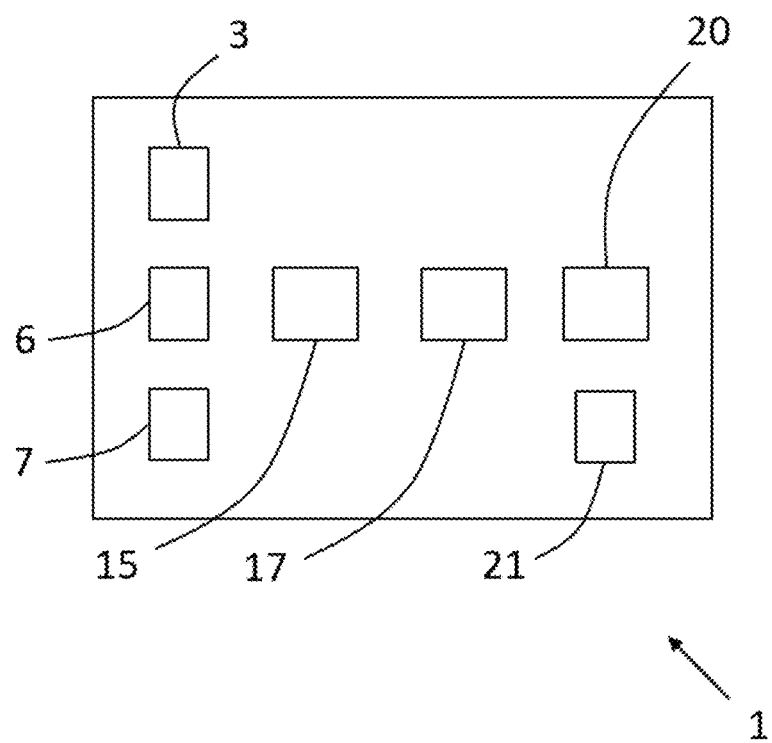
FIG. 6 shows a system for measuring Raman and infrared absorption signals from a sample according to an embodiment of the invention.

FIG. 6 shows a system (1) for simultaneous measurement of Raman and infrared absorption signals from a sample according to an embodiment of the invention. The system (1) comprising:
- an ATR crystal (3) adapted for holding a sample thereon,
- at least one Raman excitation light source (6) for Raman excitation,
- at least one FTIR excitation light source (7) for FTIR excitation,
- a single photodetector (21) configured for collecting signals with a wavelength comprised both in the IR spectrum and in the Raman spectrum,
- a wavelength-dispersive device (20), such as a spectrometer, for the collected Raman signals,
- an excitation lens (15), and
- collection optics comprising a first collection lens (17),
- wherein the ATR crystal (3) is configured to receive a light beam from the FTIR excitation light source (7), to redirect the light beam to the sample, to receive modified reflected radiation due to interaction of the evanescent field with the sample and to redirect the modified reflected radiation due to interaction of the evanescent field with the sample so that it can be received by said photodetector (21),
- wherein the excitation lens (15) and the ATR crystal (3) are positioned so that a first optical path is defined, such that the excitation lens (15) is configured to focus into the sample a light beam emitted from the Raman excitation light source (6), and wherein the ATR crystal (3) and the collection optics are positioned so that a second optical path is defined, such that the collection optics is configured to collect Raman scattered light emitted by the sample and to redirect said Raman scattered light to said photodetector (21) through the wavelength-dispersive device (20).

The invention claimed is:

1. System for simultaneous measurement of Raman and infrared absorption signals from a sample, the system comprising:
   - an ATR crystal adapted for holding the sample thereon,
   - at least one Raman excitation light source for Raman excitation,
   - at least one FTIR excitation light source for FTIR excitation,
   - at least one photodetector configured for collecting signals with a wavelength comprised at least in one of an IR spectrum and/or a Raman spectrum,
   - a wavelength-dispersive device for collected Raman signals,
   - an excitation lens, and
   - collection optics comprising a first collection lens,
   - wherein the ATR crystal is configured to receive a light beam from the at least one FTIR excitation light source, to redirect the light beam to the sample, to receive modified reflected radiation due to interaction of an evanescent field with the sample and to redirect it so that it can be received by the at least one photodetector,
   - wherein the excitation lens and the ATR crystal are positioned so that a first optical path is defined, such that the excitation lens is configured to focus into the sample a light beam emitted from the at least one Raman excitation light source,
   - wherein the ATR crystal and the collection optics are positioned so that a second optical path is defined, such that the collection optics is configured to collect Raman scattered light emitted by the sample and to redirect said Raman scattered light to the at least one photodetector through the wavelength-dispersive device,
   - wherein a Raman subsystem is an off-axis system,
   - wherein the collection lens is configured to be movable along a direction parallel to the second optical path, and
   - wherein the excitation lens is configured to be movable along a direction parallel to the first optical path and/or in a direction transverse to the first optical path.

2. The system according to claim 1, wherein the wavelength-dispersive device is a spectrometer.

3. The system according to claim 1, wherein the collection lens has a high numerical aperture value.

4. The system according to claim 3 wherein the excitation lens has a high numerical aperture value.

5. The system according to claim 3, wherein the collection lens has a numerical aperture value greater than 0.4.

6. The system according to claim 4, wherein the excitation lens has a numerical aperture value greater than 0.4.

7. The system according to claim 1, wherein the excitation lens and/or the collection lens has a low numerical aperture value.

8. The system according to claim 7, wherein the excitation lens and/or the collection lens has a numerical aperture value lower than 0.2.

9. The system according to claim 1, further comprising:
   - a first prism configured to receive a light beam from the at least one FTIR excitation light source and to redirect said light beam to the ATR crystal; and/or
   - a second prism configured to receive the modified reflected radiation from the ATR crystal, and to redirect said modified reflected radiation.

10. The system according to claim 1, further comprising a fixed mirror, a beam splitter and a movable mirror, wherein the beam splitter is configured to split the light beam emitted by the FTIR excitation light source into two split beams, wherein the fixed mirror is arranged to receive one split beam and to reflect it back to the beam splitter, wherein the movable mirror is arranged to receive the other split beam and to reflect it back to the beam splitter and wherein the first mirror is arranged to receive the beam resulting from an interference of the two split beams and to redirect it.

11. The system according to claim 1, wherein the at least one photodetector comprises a first photodetector configured for collecting signals with a wavelength comprised in the IR spectrum and a second photodetector configured for collecting signals with a wavelength comprised in the Raman spectrum together with the wavelength-dispersive device, wherein the ATR crystal is configured to redirect the modified reflected radiation so that it can be received by the first photodetector, and wherein the collection optics is configured to redirect Raman scattered light to the second photodetector through the wavelength-dispersive device.

12. The system according to claim 1, further comprising a processing unit in data communication with the at least one photodetector and the wavelength-dispersive device, the processing unit comprising a spectral data library for identifying signals measured by the at least one photodetector.

13. The system according to claim 1, further comprising a band pass filter for filtering the light beam from the at least one Raman excitation light source, wherein the band pass filter is located on the first optical path between the at least one Raman excitation light source and the excitation lens.

14. The system according to claim 1, further comprising a controller configured to control a position of the excitation lens and/or of the collection optics.

15. The system according to claim 1, wherein light beams in both Raman subsystem and FTIR subsystem are transmitted through free space without using optical fibers.

16. The system according to claim 1, further comprising:
a first mirror configured to receive a light beam from the at least one FTIR excitation light source, and to redirect said light beam; and/or
a second mirror configured to redirect the modified reflected radiation to the at least one photodetector.

17. The system according to claim 16, wherein the first mirror and/or the second mirror is a paraboloidal mirror.

18. The system according to claim 1, wherein the at least one photodetector comprises a single photodetector configured for collecting signals with a wavelength comprised both in the IR spectrum and in the Raman spectrum, wherein the ATR crystal is configured to redirect the modified reflected radiation due to interaction of the evanescent field with the sample so that it can be received by said single photodetector, and wherein the collection optics is configured to redirect Raman scattered light to said single photodetector through the wavelength-dispersive device.

19. The system according to claim 18, wherein:
the collection optics further comprises a long pass filter and a second collection lens, wherein the first collection lens, the long pass filter and the second collection lens are located on the second optical path such that:
the first collection lens is configured to collect and collimate Raman scattered light from the sample,
the long pass filter is configured for filtering the Raman scattered light collected by the first collection lens, and
the second collection lens is configured for collecting the filtered Raman scattered light from the long pass filter and to redirect said filtered Raman scattered light to the single photodetector through the wavelength-dispersive device.

20. The system according to claim 1, wherein the collection optics further comprises a long pass filter and a second collection lens, wherein the first collection lens, the long pass filter and the second collection lens are located on the second optical path such that:
the first collection lens is configured to collect and collimate Raman scattered light from the sample,
the long pass filter is configured for filtering the Raman scattered light collected by the first collection lens, and
the second collection lens is configured for collecting the filtered Raman scattered light from the long pass filter and to redirect said filtered Raman scattered light to the at least one photodetector through the wavelength-dispersive device.

21. The system according to claim 20, wherein the first collection lens, the long pass filter, the second collection lens comprised in the collection optics, the wavelength dispersive device and the second photodetector are assembled so as to be movable in a direction transverse to the second optical path.

22. A method for adding a new record to a spectral data library, wherein the method comprises the steps of:
i) providing a system according to claim 12;
ii) placing a new sample on the ATR crystal to be held thereon;
iii) activate both the at least one Raman excitation light source for Raman excitation and the at least one FTIR excitation light source for FTIR excitation;
iv) collecting both signals by the at least one photodetector;
v) associating a measured signal to such new sample thus forming the new record; and
vi) adding such new record to the spectral data library stored in the processing unit of the system.

* * * * *